(12) United States Patent
Kinoshita et al.

(10) Patent No.: US 9,967,163 B2
(45) Date of Patent: May 8, 2018

(54) MESSAGE SYSTEM FOR AVOIDING PROCESSING-PERFORMANCE DECLINE

(71) Applicant: HITACHI, LTD., Tokyo (JP)

(72) Inventors: Masafumi Kinoshita, Tokyo (JP); Takafumi Koike, Tokyo (JP); Izumi Mizutani, Tokyo (JP); Naoki Haraguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 294 days.

(21) Appl. No.: 14/784,626

(22) PCT Filed: Apr. 14, 2014

(86) PCT No.: PCT/JP2014/060565
§ 371 (c)(1),
(2) Date: Jan. 25, 2016

(87) PCT Pub. No.: WO2014/171413
PCT Pub. Date: Oct. 23, 2014

(65) Prior Publication Data
US 2016/0261476 A1 Sep. 8, 2016

(30) Foreign Application Priority Data
Apr. 16, 2013 (JP) .................... 2013-085353

(51) Int. Cl.
*G06F 15/16* (2006.01)
*H04L 12/26* (2006.01)
(Continued)

(52) U.S. Cl.
CPC ...... *H04L 43/0811* (2013.01); *H04L 43/0817* (2013.01); *H04L 51/14* (2013.01);
(Continued)

(58) Field of Classification Search
CPC . H04L 43/0811; H04L 43/0817; H04L 51/14; H04L 51/26; H04L 67/1002; H04L 67/26
(Continued)

(56) References Cited

U.S. PATENT DOCUMENTS 6,018,619 A * 1/2000 Allard ..................... H04L 29/06
709/211
7,010,598 B2 * 3/2006 Sitaraman ............... H04L 43/00
709/224
(Continued)

FOREIGN PATENT DOCUMENTS

| JP | 2011-170772 A | 9/2011 |
| JP | 2011-197796 A | 10/2011 |
| JP | 2012-235220 A | 11/2012 |

OTHER PUBLICATIONS

Masafumi Kinoshita, et al., "Throughput Improvement of Mail Gateway in Cooperation with Distributed In-memory KVS," Proceedings of the 2011 IEICE General Conference 2, Aug. 30, 2011 (Aug. 30, 2011), p. 412.
(Continued)

*Primary Examiner* — Thu Ha Nguyen
(74) *Attorney, Agent, or Firm* — Volpe and Koenig, P.C.

(57) ABSTRACT

This server for distributing messages quickly detects a performance decline in a downstream server by using a method for keeping, for each distribution-destination server, a threshold such as a connection number and a time interval separate from a response timeout, and determining that performance has declined when the threshold is exceeded. In addition, the present invention improves system availability by identifying a server group in which performance has declined on the basis of a correlation pertaining to inter-server cooperative processing, when a distribution server
(Continued)

exhibits a decline in performance, and by the distribution server distributing a message to a server not exhibiting a decline in performance.

10 Claims, 6 Drawing Sheets

(51) Int. Cl.
*H04L 12/58* (2006.01)
*H04L 29/08* (2006.01)

(52) U.S. Cl.
CPC .............. *H04L 51/26* (2013.01); *H04L 51/30* (2013.01); *H04L 67/1002* (2013.01); *H04L 67/26* (2013.01)

(58) Field of Classification Search
USPC .................. 706/206, 207; 709/203, 206, 207
See application file for complete search history.

(56) References Cited

U.S. PATENT DOCUMENTS

| | | | | |
|---|---|---|---|---|
| 7,720,864 | B1* | 5/2010 | Muth ................ | G06F 17/30171 707/707 |
| 8,438,298 | B2* | 5/2013 | Arai .......................... | G06F 8/65 709/203 |
| 8,831,995 | B2* | 9/2014 | Holler ....................... | G06F 8/65 705/51 |
| 8,832,801 | B1* | 9/2014 | Ganesan ................. | H04L 63/08 705/51 |
| 2003/0144850 | A1* | 7/2003 | Franks ................... | G06Q 10/10 705/310 |
| 2003/0221000 | A1* | 11/2003 | Cherkasova ............ | H04L 67/24 709/224 |
| 2004/0059789 | A1* | 3/2004 | Shum ................... | G06Q 10/107 709/206 |
| 2004/0128346 | A1* | 7/2004 | Melamed .......... | G06F 17/30902 709/203 |
| 2004/0267618 | A1* | 12/2004 | Judicibus ............... | G06Q 20/00 705/16 |
| 2006/0077946 | A1* | 4/2006 | Adya .................... | H04W 24/04 370/349 |
| 2007/0174428 | A1* | 7/2007 | Lev Ran ................. | G06F 9/546 709/218 |
| 2009/0043881 | A1* | 2/2009 | Alstad ................. | G06F 12/0813 709/224 |
| 2009/0292649 | A1* | 11/2009 | Somech ................. | G06Q 40/02 705/36 R |
| 2010/0138476 | A1* | 6/2010 | Gokaraju .............. | G06F 9/4445 709/203 |
| 2011/0098917 | A1* | 4/2011 | LeBeau ................. | G01C 21/265 701/533 |
| 2012/0124431 | A1 | 5/2012 | Bauer et al. | |
| 2012/0254300 | A1* | 10/2012 | Rai ..................... | H04L 67/1002 709/203 |
| 2012/0278409 | A1 | 11/2012 | Kinoshita et al. | |
| 2013/0036476 | A1* | 2/2013 | Roever ................... | H04L 63/08 726/27 |
| 2016/0035019 | A1* | 2/2016 | Rosner ................... | G06Q 30/08 705/80 |
| 2016/0154794 | A1* | 6/2016 | Knapp ................. | G06F 17/302 707/626 |

OTHER PUBLICATIONS

Leslie Lamport, "Paxos made simple," online, Nov. 2001, ACM SIGACT News 32, [searched on Apr. 11, 2013], Internet <http://www.cs.utexas.edu/users/ lorenzo/corsi/cs380d/past/03F/notes/paxos-simple.pdf>.

* cited by examiner

MESSAGE SYSTEM FOR AVOIDING PROCESSING-PERFORMANCE DECLINE

INCORPORATION BY REFERENCE

The present application claims the benefit of priority of Japanese Patent Application No. 2013-085353, filed on Apr. 16, 2013, the entire contents of which are incorporated herein by reference.

TECHNICAL FIELD

The subject disclosed in the present specification relates to a technology of a message server.

BACKGROUND ART

A message service, such as an electronic mail service or a social network service (SNS), which is available from a mobile phone or a communication terminal (hereinafter, referred to as a mobile phone), becomes indispensable as a means of communication, and a message system that provides the message service is required to have a high availability without stopping services 24 hours a day and 365 days a year, and a high service quality. The message system that provides the message service is configured to include a plurality of server apparatuses that manages message processing (hereinafter, the server apparatuses will be referred to as servers).

As a method for improving the availability or the service quality of the message system, methods of Patent Literatures 1 and 2 are proposed.

Specifically, there are proposed a method by which a load balancer (or a distribution device) is installed in front of a plurality of servers and the load balancer measures a response time with respect to a request of each server and distributes the loads of the servers (paragraphs 0008 and 0013 of Patent Literature 1), and a method which acquires a load state of each server or a state of garbage collection of Java (registered trademark) VM and distributes messages (paragraphs 0007 and 0028 of Patent Literature 2).

These methods aim to avoid a performance decline of an entire system or a partial service outage even when some servers of the system fall into a failure or a decrease in a processing speed.

CITATION LIST

Patent Literatures

PATENT LITERATURE 1: JP-A-2011-197796
PATENT LITERATURE 2: JP-A-2011-170772

Non Patent Literature

NON PATENT LITERATURE 1: Leslie Lamport, "Paxos made simple", online, November 2001, ACM SIGACT News 32, [searched on Apr. 11, 2013], Internet <http://www.cs.utexas.edu/users/lorenzo/corsi/cs380d/past/03F/notes/paxos-simple.pdf

SUMMARY

Problem

In recent years, as smart phones have become widespread, a traffic volume of an electronic mail of a mobile phone or a message of an SNS has enormously increased. Furthermore, the spread of Machine to Machine (M2M) communication scheme in which a large amount of articles, such as sensors, vehicles, or the like, is connected to a network and performs information (message) exchange is predicted, and the generation of further enormous message traffic is predicted.

Patent Literatures 1 and 2 have the following problems in a situation that requires mass message processing as described above.

The first problem is that it is difficult to determine a performance decline in a short time, specifically, in one second or less. Generally, in many cases, a maximum waiting time of a response (response timeout) is set to a failure switching time (several seconds or more) of a switch or a router that connects servers to each other. For example, when the response timeout is shorter than the failure switching time of the switch, it is likely to cause problems that a message to be originally acquired by a failure switching will become response-timeout, each server will falsely detect that an error occurs in mass message processing and a failure occurs in a network, a service is stopped, or the like.

The failure switching operation of the switch will be supplementarily described. Upon the failure switching, processing can be continued without errors by switching a path between the servers to a communicable network and retransmitting a message through retransmission processing such as Transmission Control Protocol (TCP) or the like.

Therefore, in the system requiring the availability, the response timeout is set to be equal to or greater than the switching time of the network such as the switch or the like. Regarding the above problem, Patent Literature 1 merely mentions a simple determination of a response time performance decline, and the method of Patent Literature 2 is limited to a case where the cause of the performance decline is FullGC or the like of Java.

The second problem is that it is difficult to detect a performance decline or set a threshold value for detection when a message server cooperates. As an example in which a plurality of servers cooperate, Non Patent Literature 1 discloses a method by which a plurality of servers agrees with one another through a network. In a case where processing being a plurality of message servers cooperates, if one server exhibits a decline in performance, the cooperating servers also exhibit a decline in performance. When the performance of the entire processing of the servers, which cooperate with the server whose processing speed is decreased, does not uniformly decline and is associated with the cooperative processing, it depends on a situation in which the speed of the cooperative processing declines. Therefore, there are cases where it is difficult to detect the determination of the response time by a simple setting of the threshold value as in Patent Literature 1. In the method of Patent Literature 2, it is impossible to detect the performance decline of one server, the above cannot be detected at all.

That is, in a message system that performs mass message processing, there is a need for a technology that solves the above two problems.

Solution to Problem

The present specification discloses a technology that detects a performance decline in a shorter time than the past by a method by which a server for distributing messages (hereinafter, referred to as a distribution server) holds a threshold value, such as a connection number and time separate from a response timeout, in each distribution-destination server, and determines that performance has declined in the case of exceeding the threshold value.

In addition, the present specification discloses a technology that improves system availability and service quality by identifying a server group in which performance has declined on the basis of a correlation associated with inter-server cooperative processing when a distribution server exhibits a decline in performance (hereinafter, performance decline determination processing), and distributing, by the distribution server, a message to a server that does not exhibit a decline in performance.

In this case, the distribution server prevents a double message transmission to a data store server by continuing a response waiting of a message having been transmitted prior to the determination to the server group exhibiting a decline in performance.

The message in the present specification includes an electronic mail of a mobile phone, a message of an SNS, sensor information, data transmitted by articles such as a vehicle, and the like.

The disclosed message system is configured to include a distribution server for distributing messages, and a server for processing a plurality of messages. The distribution server always monitors parameters, such as time or connection number, so as to determine a decline in performance for each server being a distribution destination, manages correlation information (configuration information) related to cooperative processing of each server, and detects a server group exhibiting the decline in the performance from these information. The distribution server distributes the message to avoid the server group exhibiting the decline in the performance from the message subsequently distributing the message.

One specific aspect is a system configured to include a distribution server for distributing a message, and a server for processing a plurality of messages, wherein the distribution server includes: a function of transmitting a message to a server that processes the message; a function of managing a message forwarding time or connection number with respect to each server; a function of determining that performance has declined when the time or the connection number exceeds a threshold value; a function of acquiring correlation information related to cooperative processing of each server; a function of identifying a server group exhibiting a decline in the performance from the performance decline and the correlation information; and a function of distributing a message while avoiding the server group exhibiting the decline in the performance.

Advantageous Effects

According to the disclosure, in the message system configured to include a plurality of servers, it is possible to avoid the performance decline of the entire system or the partial service outage even when some servers of the system fall into the failure or the decrease in the processing speed.

DESCRIPTION OF EMBODIMENTS

Hereinafter, embodiments will be described with reference to the drawings.

In the present embodiment, as an example of a message system that processes a mass message, a message system configured to include a message receiving server that has a message receiving function, a plurality of data store servers (or key-value store, data grid, or the like) that stores a message, and a message sending server having a message transmitting function will be described.

The permanence of data is realized in a manner such that the data store server duplicates the same data and the same data is multiply-held in the plurality of data store servers. The data store server performs processing, such as storing, updating, deleting, or the like of data, in cooperation between the plurality of data store servers that holds (or must hold) the data. In addition, in the present embodiment, the data store server is a key-value store that manages data by a pair of a key and a value.

Each server of Patent Literatures 1 and 2 need not hold information such as the processing state of the server, that is, each server is stateless. However, the data store server of the present embodiment holds information such as the processing state, that is, the data store server is stateful. The stateful server needs processing such as taking over the state (data) at the time of failure and is widely used in a system that is complicated but requires availability.

In the present embodiment, the following description will be given of a problem caused by a difference in a configuration in which the data store server is stateful, at the time of performance decline in a stateful server and a high-availability system, which are not mentioned in Patent Literature 1 and Patent Literature 2, and a solving method.

In addition, as an example of a mass message in the present embodiment, a message such as a mail of a mobile communication carrier will be described.

Figure 1:
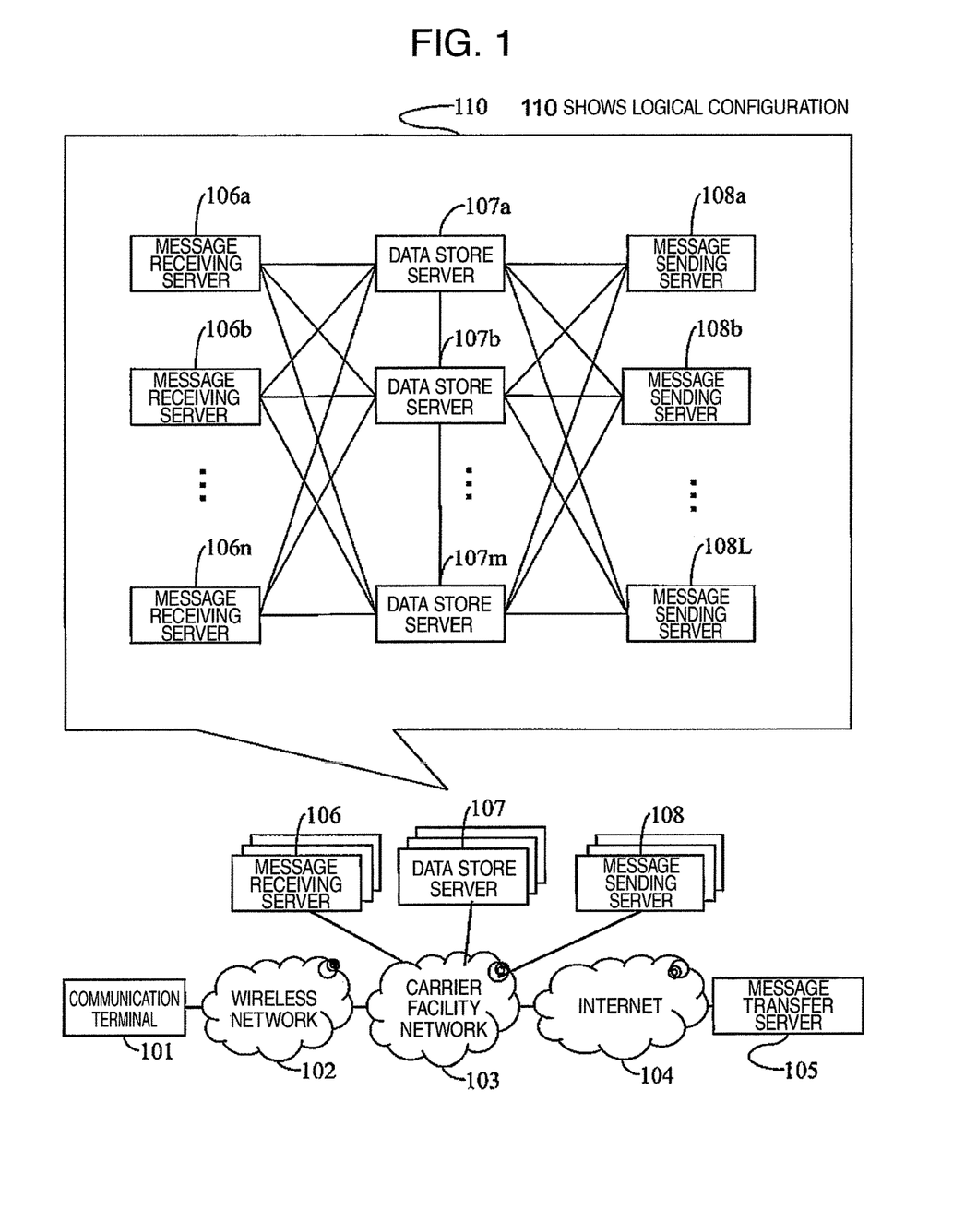
FIG. 1 is a block diagram illustrating a schematic configuration of a system according to a first embodiment.

FIG. 1 is a block diagram illustrating a system configuration of a message system of the present embodiment.

The message system of the present embodiment is configured within a carrier facility network 103 and includes a message receiving server 106, a data store server 107, and a message sending server 108.

A communication terminal 101 represents a terminal device capable of data communication, such as a mobile phone, a tablet, a PC, or the like and is connected via a wireless network 102 to the message system of the present embodiment within the carrier facility network 103. The wireless network 102 is a wireless network that is managed by the mobile communication carrier. The carrier facility network 103 is a network or a network facility that relays the communication from the wireless network 102 to the Internet 104 and the message receiving server 106. The wireless network 102 and the carrier facility network 103 are managed by the mobile communication carrier that manages the message receiving server 106 of the present embodiment.

The message transfer server 105 is also called a Mail Transfer Agent (MTA). The message transfer server 105 is connected via the Internet 104 to the message system of the present embodiment within the carrier facility network 103 and performs message transmission and reception with the message receiving server 106. The message transfer server 105 is installed in a facility network that is managed by an Internet provider or a communication operator such as other mobile communication carrier. The message transfer server 105 performs processing of transmitting, to the message receiving server 106, a message of other communication operator that manages the message transfer server 105.

The system of the message system of the present embodiment is configured to include a plurality of message receiving servers 106, a plurality of data store servers 107, and a plurality of message sending servers 108. As indicated by a logical configuration 110 of the message system, the message receiving server 106 and the data store server 107, the data store server 107 and the message sending server 108, and the plurality of data store servers 107 are respectively connected to each other in a mesh shape. Each server of the logical configuration 110 may be an actual server apparatus and may be a virtual machine.

In addition, each server of the logical configuration 110 may be provided in such a manner that a plurality of types of servers is disposed on the same server apparatus as a server program. For example, the message receiving server 106 and the data store server 107 may be disposed in the same server apparatus, and the plurality of data store servers 107 may be disposed in the same server. The system configuration of the present embodiment is not limited to FIG. 1 and can also be applied to a messaging system having other configuration.

The system of the message system of the present embodiment realizes a leveling of an information quantity flowing into the system or an immediate response preventing a user from waiting by perform a relay in a so-called store-and-forward method that stores messages received from the communication terminal 101 or the message transfer server 105 in a storage area called a queue at a time and performs sequential transmission processing.

In the present embodiment, message reception processing is supervised by the message receiving server 106, queue retention is supervised by the data store server 107, and message transmission processing is supervised by the message sending server 108.

The message receiving server 106 performs processing of storing a message received from the communication terminal 101 or the message transfer server 105 in the data store server 107.

The message sending server 108 acquires a message stored in the data store server 107 and transmits the message to a message destination server, such as the message transfer server 105, or a server that relays the message to a destination server.

The data store server 107 manages data by a pair of a key and a value, multiply-holds the same data (key and value) in the plurality of data store servers 107, and performs processing of data requested from the message receiving server 106 or the message sending server 108.

One of the message receiving server 106, the data store server 107, and the message sending server 108 may perform authentication processing and accounting process in addition to the above-described processing, message conversion processing, and processing of congestion control or the like, which are the message system of the mobile communication carrier in the present embodiment.

In the present embodiment, a sequence in which a message transmission path is sequentially the communication terminal 101, the message receiving server 106, the data store server 107, and the message sending server 108 is described as an example, but is not limited thereto. The present embodiment can also be applied to other sequences. In addition, the application range of the messaging system disclosed in the present embodiment is not limited to a mail or a short message. The present embodiment can be applied to a device, such as a sensor, a vehicle, or a meter, which is connected to the wireless network 102, and a message (or data) to be transmitted. In addition, the present embodiment can also be applied to a network form such as a wired network, a smart grid, or the like, instead of the wireless network 102.

Figure 2:
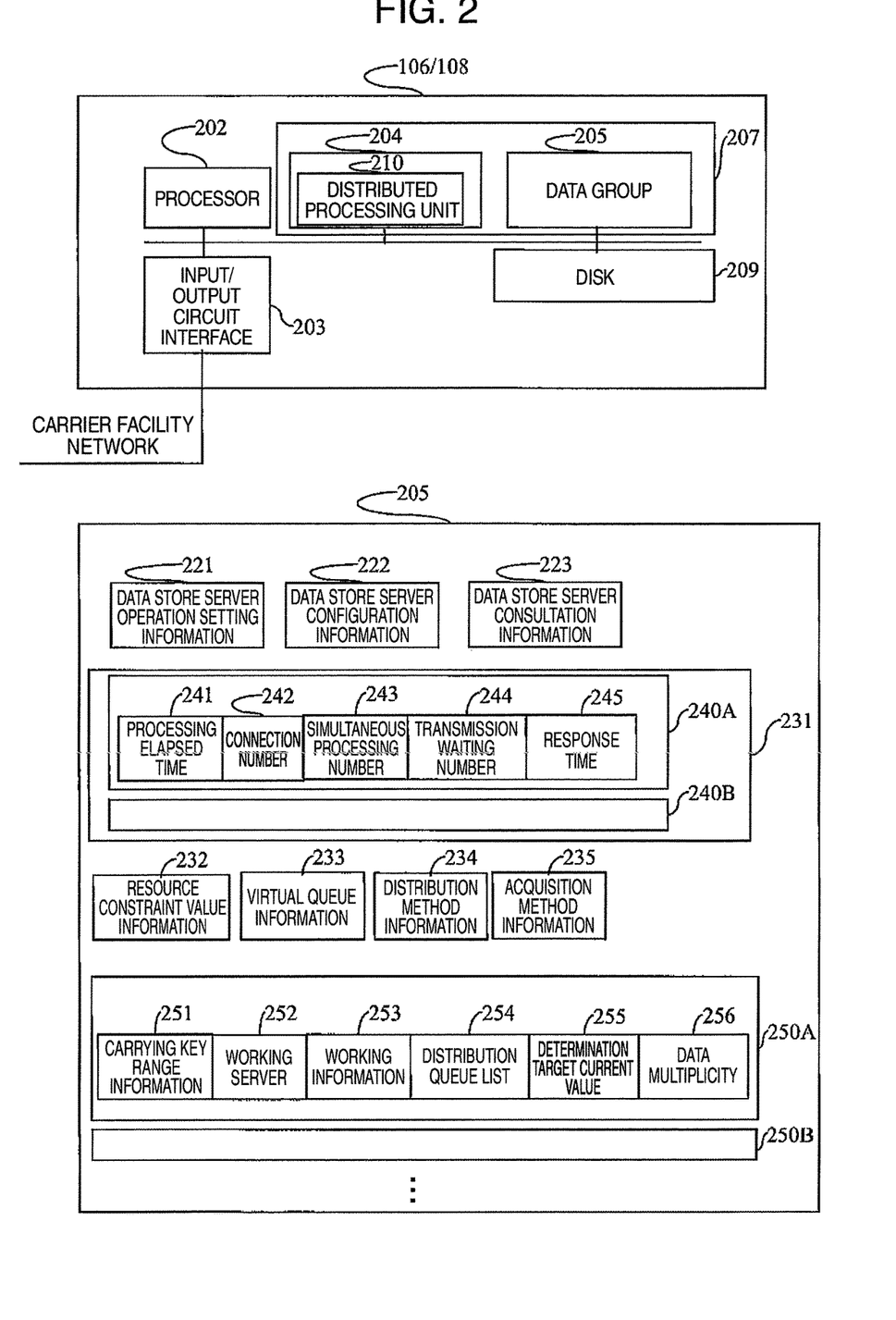
FIG. 2 is a block diagram illustrating a configuration of a message receiving server 106 or a message sending server 108.

FIG. 2 is a hardware configuration of an information processing apparatus that realizes the message receiving server 106 or the message sending server 108. The information processing apparatus that realizes the message receiving server 106 or the message sending server 108 is configured to include a processor 202, a volatile memory 207, a disk 209 being a nonvolatile storage unit, an input/output circuit interface 203 for transmitting and receiving data to and from the carrier facility network 103, and an internal communication line such as a bus for connecting these to one another. In order to reduce the influence at the time of failure, the input/output circuit interface 203 may be configured to be connected to two or more networks.

The volatile memory 207 includes a message processing program 204 and a data group 205. A distributed processing unit 210, which performs processing of storing messages (data) in the plurality of data store servers 107 in a distributed manner, and various control programs, which realize message processing, are included in the message processing program 204, and these are performed by the processor 202. In the present embodiment, the contents of the message processing program 204 are different from the message receiving server 106 and the message sending server 108, but both the message processing program 204 can also be configured to include the functions of both the message receiving server 106 and the message sending server 108.

The message processing program 204 may be previously stored in the volatile memory 207 or the disk 209, or may be introduced into the volatile memory 207 or the disk 209 through a removable storage medium (not illustrated) or a communication medium (not illustrated) (that is, a network, or a digital signal or a carrier wave that propagates it). The disk 209 further stores data such as a log output by the message processing program 204 or a setting file of the message processing program 204.

The contents to be described below are the realization as the function of the message receiving server 106 or the message sending server 108 in a manner such that the program included in the distributed processing unit 210 is executed by the processor 202. In the present embodiment, the data group 205 used for processing by the message processing program 204 are illustrated as elements separate from the message processing program 204 in functional terms, but the data group 205 may be included in the message processing program 204.

The data group 205 is configured to include data store server operation setting information 221, data store server configuration information 222, data store server consultation information 223, performance decline determination condition 231, resource limit value information 232, virtual queue information 233, distribution method information 234, acquisition method information 235, and data store server status information 250.

Information about a method of holding data between the plurality of data store servers 107 and/or an operation setting of the data store server 107 is stored in the data store server operation setting information 221. For example, the data store server operation setting information 221 is configured to include information (multiplicity of data) about the number of the data store servers 107 to hold the data, a method (data holding method) of holding and managing the data between the plurality of data store servers 107, and an operation (operation setting for each request) at the time of processing according to a request received by the data store server 107.

In the data holding method, a consistency holding type that holds the data in the same state between the plurality of data store servers 107, and a method (availability holding type) of preferring a service continuity of the data store server 107 instead of permitting inconsistency of data states are set. In the operation setting for each request, information about the number of the data store servers 107 cooperating with one another, and information about the number or more of the data store servers 107, at which the processing is determined as successful with respect to the request when the processing of the corresponding data store servers 107 is successful are stored for each request such as storage, acquisition, update, deletion, and comparison of data.

Hereinafter, in the present embodiment, a case where the multiplicity of data of the data store server operation setting information 221 is 3 and the type is the consistency holding type will be described. In addition, in the operation setting for each request, the setting as storage success when data are stored in three data store servers 107 in the setting of the storage, update, and deletion request, and the acquisition of data from one data store server 107 in the setting of the acquisition request are set. However, the multiplicity of the data may be other than 3, and it is also possible to configure an availability holding type system.

Due to the data store server operation setting information 221, the distributed processing unit 210 can be adapted to the type or the processing form of the data store server 107, thereby realizing the performance decline determination processing of the data store server 107 to be described below.

In the data store server configuration information 222, working information and correlation information between the data store servers 107, which the distributed processing unit 210 periodically acquires from the data store servers 107, are stored. The correlation information between the data store servers 107 is information (hereinafter, key range carrying information) about which data store server 107 of the message system holds key data and which key data is held in the data store server 107, and information associated with the cooperation processing between the data store servers 107, such as whether the data store server 107 is a master or a slave with respect to the key range carrying information. The correlation information may be generated based on the consultation information to be described below.

The working information holds information about which key range holds the data and at which multiplicity the key range holds the data, among key ranges included in the correlation information, in addition to the working information of each data store server 107 (for example, even when the data multiplicity is 3, the data multiplicity becomes 2 if one data store server 107 holding the data is stopped by a failure or the like.

The data store server consultation information 223 is information determined by, for example, a method called a gossip protocol, based on information about the data store servers which is exchanged between the data store servers 107. Similar to the data store server configuration information 222, the data store server consultation information 223 includes the working status or correlation information of the data store servers 107. The distributed processing unit 210 acquires the data store server configuration information which the data store server 107 periodically transmits by a multicast or the like, and updates the data store server configuration information 222.

The distributed processing unit 210 determines the performance decline of the data store server 107 to be described below by using one of the data store server consultation information 223 and the data store server configuration information 222, but may use both of them. Hereinafter, in the present embodiment, the data store server configuration information 222 is used.

The performance decline determination condition 231 is a condition (threshold value) for allowing the distributed processing unit 210 to determine the performance decline of the data store server 107, and holds a condition for each request type, such as storage request performance decline determination condition 240A and acquisition request performance decline determination condition 240B. The performance decline determination condition 231 is configured for each request type to include processing elapsed time 241, connection number 242, simultaneous processing number 243, transmission waiting number 244, and response time 245.

The distributed processing unit 210 compares the values acquired from the communication processing with the data store server 107 or the data store server configuration information 222 (a current value 255 of a determination target (described below)) with the performance decline determination condition 231, and when one of the values exceeds, the distributed processing unit 210 determines that the performance of the data store server 107 declines. Each parameter of the performance decline determination condition 231 is a threshold value that is compared with an average value, and includes information about the minimum time of times necessary for the distributed processing unit 210 to determine that the performance declines.

In the processing elapsed time 241, a threshold value of an elapsed time after the distributed processing unit 210 transmits the request to the data store server 107 is described. In the connection number 242, a threshold value of the number of connections to be connected to the data store server 107 by the distributed processing unit 210 is described.

In the simultaneous processing number 243, threshold values of the number of processing, the number of processes, and the number of threads, which are simultaneously performed by the distributed processing unit 210, are described.

In the transmission waiting number 244, a threshold value of the number of messages of the distributed processing unit 210 waiting for transmission to the data store server 107 is described.

The response time 245 is a threshold value of a time (average value) at which the distributed processing unit 210 receives a response after transmitting a request to the data store server 107.

Here, unlike the response time 245 that is an actual value, the processing elapsed time 241 is an elapsed time from the transmission of the request being currently processed, the response of which has not been received from the data store server 107 by the distributed processing unit 210, and is set to be shorter than the response time. Generally, the server that processes the message has a response timeout during which the server transmits the message to an external server and waits a response. When the response is within the response timeout at the time of reception, a normal response is received and added to the response time 245. When the response is received after the response timeout, the response is determined as an error.

The present embodiment assumes the system in which the response time 245 is set to an order from several milliseconds to several seconds and the response timeout is set to an order from several seconds to several minutes. In this case, it is preferable that the processing elapsed time 241 is set to an order from several microseconds to one second.

In addition, the performance decline determination condition 231 holds the condition in the request type because whether the execution for each request type is possible or impossible is different according to the cooperation processing of the data store server 107, the performance decline factor, and the working status of the data store server 107 for each request type such as storage, acquisition, or the like by the data store server operation setting information 221.

The resource limit value information 232 is a limit value for protecting the resources so that the distributed processing unit 210 transmits the request to the data store server 107, and is a limit value such as the number of processes which the distributed processing unit 210 simultaneously executes by the response of the data store server 107, the number of connections, and the number of transmission waiting to the distributed processing unit 210. The resource limit value information 232 holds a plurality of values for each state such as at the normal time and at the time of the performance decline determination. The distributed processing unit 210 avoids using up all resources in the request processing to the data store server 107 exhibiting a decline in the process performance due to the resource limit value information 232.

The virtual queue information 233 stores management information for centrally managing the queue data 340 (hereinafter, sometimes referred to as a distributed queue), which is held by each of the plurality of data store servers 107, as the virtual queue in the message system.

The distribution method information 234 stores information of the distribution method of the distribution queue held in the data store server 107 by the distributed processing unit 210 (distribution method at the time of storing). In the present embodiment, the virtual queue is provided for each message destination in the entire system, and for example, the distributed processing unit 210 selects the same virtual queue when the messages have the same destination. The actual data of the virtual queue is stored in the distribution queue of the data store server 107, and a plurality of distribution queues corresponds to one virtual queue. In other words, the virtual queue is configured to include the plurality of distribution queues. The virtual queue information 233 stores correspondence information about each virtual queue and a plurality of distribution queues corresponding to thereto, and information for centrally managing information about the plurality of distribution queues.

The virtual queue information 233 is shared in the distributed processing units 210 respectively included in the plurality of receiving servers and the plurality of transmitting servers within the message system. In the sharing mechanism, first, any one of the plurality of distributed processing units 210 of the message system updates the virtual queue information 233 in the data store server 107 and stores it in the data store server 107 as the virtual queue information 331. Other distributed processing units 210 periodically acquire the virtual queue information 331 from the data store servers 107 and update the virtual queue information 233 inside their own servers. The message system of the present embodiment holds a plurality of types of virtual queues.

The distribution method information 234 stores a distribution method by a hash calculation of a key and a distribution method such as a round robin, a least connection, or the like. In addition, the distribution method information 234 may be dynamically changed when the performance decline of the data store server 107 occurs due to the performance decline determination processing.

The acquisition method information 235 stores information that identifies the data store server 107 (data store server status information 250) from which the message receiving server 106 or the message sending server 108 can acquire the message, and the acquisition priority thereof (details will be described with reference to FIG. 5). Specifically, information about acquisition from all or part of the acquirable data store servers 107 is set, information about from which data store server 107 the message is preferentially acquired among the plurality of set data store servers, or for example, information about the preferential acquisition from the data store server 107 having a larger number of messages.

The acquisition method information 235 may set the distribution queue (distribution queue data 340) held in the data store server 107 and the acquisition priority for each distribution queue, instead of the data store server 107.

The data store server status information 250 is configured to include carrying key range information 251, an working server 252, working information 253, a distribution queue list 254, a determination target current value 255, and a data multiplicity 256.

In the carrying key range information 251, the key range of the data held by each data store server 107 is described. In the working server 252, an IP address of the data store server 107 (a plurality of units including a master and a slave) currently supervising the key range is described.

The carrying key range information 251 and the working server 252 are dynamically changed when the distributed processing unit 210 originally creates the data store server configuration information 222 and the data store server 107 fails or the configuration is changed.

The working information 253 stores server status of the plurality of data store servers 107 including the master and the slave. In the distribution queue list 254, the list of distribution queues included in the range of the carrying key range information 251 is described and is dynamically changed at the time of the failure of the data store server 107 or the configuration change.

In a normal mode, the distributed processing unit 210 selects the data store server status information 250 that is the distribution queue list 254 corresponding to the virtual queue information 233.

In the determination target current value 255, a parameter being a target of the performance decline determination condition 231 is described. The determination target current value 255 stores current values corresponding to the processing elapsed time 241, the connection number 242, the simultaneous processing 243, the transmission waiting number 244, and the average response time 245.

The data multiplicity 256 is a multiplicity of data (distribution queue) included in the range of the carrying key range information 251. The data multiplicity 256 is generally matched with the number of the working data store servers 107 holding the data included in the range of the carrying key range information 251, but stores the number of the working data store servers 107 of an actual environment in a case where the data store server 107 is executed in a virtual environment or the like.

Due to the data multiplicity 256, the distributed processing unit 210 can hold the data multiplicity separately from the setting of the data store server 107 and can perform flexible control on the data multiplicity in a situation of an application of the message receiving server 106 or a virtual environment (generally, the data store server 107 cannot perform control on the data multiplicity with respect to each message).

In the present embodiment, the data store server status information 250 is created for each carrying key range information 251, but is not limited thereto. For example, the data store server status information 250 may be created for each distribution queue.

Figure 3:
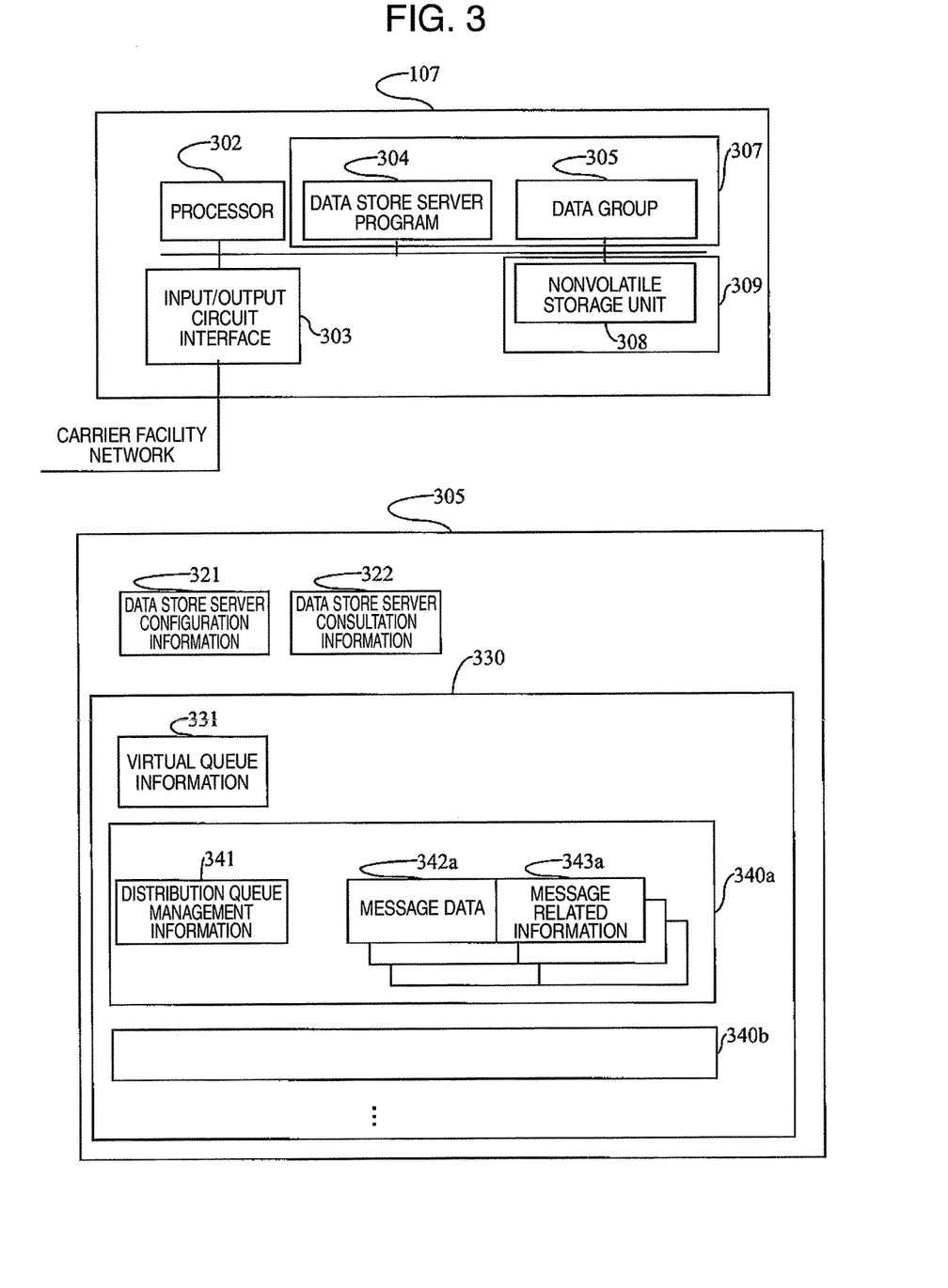
FIG. 3 is a block diagram illustrating a configuration of a data store server 107.

FIG. 3 is a hardware configuration of an information processing apparatus that realizes the data store server 107. The information processing apparatus that realizes the data store server 107 is configured to include a processor 302, a volatile memory 307, a disk 309 being a nonvolatile storage unit, an input/output circuit interface 303 for transmitting and receiving data to and from the carrier facility network 103, and an internal communication line such as a bus for connecting these to one another.

The volatile memory 307 or the disk 309 stores a data store server program 304 and also includes a data group 305. The data store server program 304 includes various control programs for realizing message processing, and these control programs are realized by the processor 302.

The data store server program 304 may be previously stored in the volatile memory 207 or the disk 209, or may be introduced into the volatile memory 207 or the disk 209 through a removable storage medium (not illustrated) or a communication medium (not illustrated) (that is, a network, or a digital signal or a carrier wave that propagates it). The disk 309 further stores data such as a log output by the data store server program 304 or a setting file of the data store server program 304.

The contents to be described below are the realization as the function of the data store server 107 in a manner such that various control programs included in the data store server program 304 are executed by the processor 302.

The data group 305 is configured to include data store server configuration information 321, data store server consultation information 322, and a data store region 330.

The data store server configuration information 321 is configured to include the same contents as the data store server configuration information 222 of FIG. 2. However, the data store server configuration information 321 is created and used by the data store server 107 and may have a different data format from the data store server configuration information 222. Similarly, the data store server consultation information 322 is configured to include the same contents as the data store server consultation information 223 of FIG. 2. The data store server program 304 exchanges the data store server consultation information 223 between other data store server programs 304 and creates the data store server configuration information 222.

The data store region 330 is a region in which the data store server 107 stores the data (storage request) received from the message receiving server 106 (distributed processing unit 210). In the present embodiment, since the data store server 107 is a key value store, a key corresponding to the data (value) is stored together in each data stored in the data store 330. However, in the present invention, for simplicity, only the data (value) is expressed and the key is omitted.

Even though each information 321, 322, and 330 is stored in the nonvolatile storage unit 308, the function of the data store server program 304 can be realized.

The data store 330 is configured to include virtual queue information 331 and a plurality of distribution queue data 340.

The virtual queue information 331 is the same information as the virtual queue information 233 and is held in the data store server 107 so that the plurality of distributed processing unit 210 shares the virtual queue information in the entire message system.

The distribution queue data 340 (data store 330) is multiply-held in the plurality of data store servers 107. The distribution queue data 340 is configured to include one distribution queue management information 341, a plurality of message data 342, and message related information 343.

The distribution queue management information 341 is information for managing the plurality of message data 342 and the message related information 343, which are included in the distribution queue data 340, and this information enables the data store server program 304 to realize the function as the queue. The distribution queue management information 341 is configured to include an identifier of the distribution queue data 340, information about whether the distribution queue data 340 is a master or a slave, information about a processing order such as a message storing order or a message extracting order, a maximum number of message data that can be stored in the distribution queue data 340 (or a data size that can be used by the distribution queue data 340), the number of message data stored in the current distribution queue data 340 and a used data size, and information such as an exclusive control for extracting messages one by one from the plurality of distributed processing unit 210.

Due to the exclusive control, the message extracted by a certain distributed processing unit 210 cannot be extracted for a certain period of time from another distributed processing unit 210, and the multiple processing of one message can be prevented.

The message data 342 is data of a message that is received from the message receiving server 106 and is then stored. The message related information 343 is information such as additional information related to the message data 342. The message receiving server 106 or the message sending server 108 performs message processing by using the message related information 343.

Figure 4:
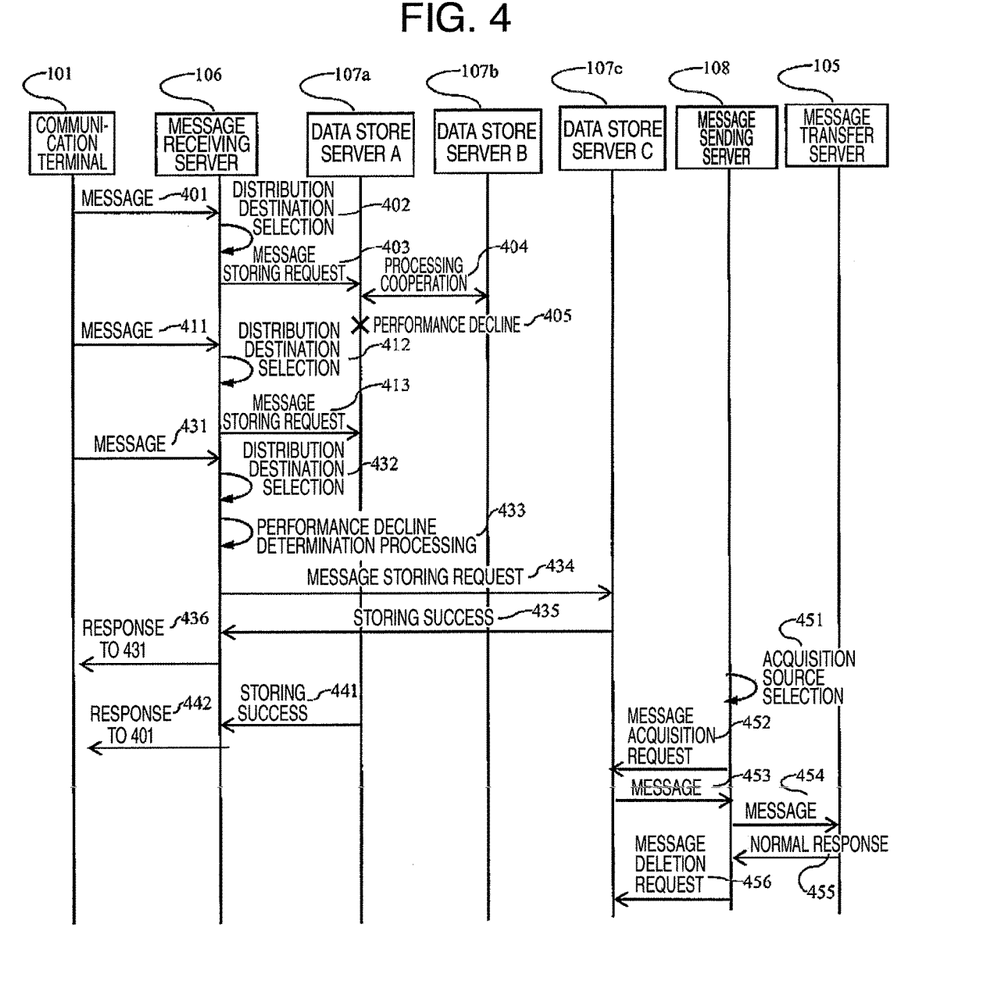
FIG. 4 illustrates an example of a message relay sequence of a message system.

FIG. 4 is a diagram illustrating an example of a message relay sequence of the message system.

Steps 401 to 442 illustrates a message reception sequence of a message receiving server 106, and step 405 illustrates an example in which a performance of a data store server 107a has declined.

First, the message receiving server 106 receives a message transmitted by a communication terminal 101 (step 401), selects a virtual queue to be stored from a message destination and virtual queue information 233, includes a distribution queue corresponding to the virtual queue in a distribution queue list 254 according to distribution method information 234, selects data store server status information 250 (step 402), and transmits a message storing request to the data store server 107a (step 403). In order to multiplexing the message (data) received between a plurality of data store servers 107, including a data store server 107b, the data store server 107a performs a storing request processing cooperation (step 404). Next, in step 405, a performance decline occurs in the data store server 107a. At this time, the message receiving server 106 is in a state of waiting for a response to the message storing request 403.

Next, the message receiving server 106 receives another message transmitted by the communication terminal 101 (step 411), selects a distribution destination (storage destination) (step 412), and transmits the message storing request to the data store server 107 (step 413). Here, it is assumed that the message receiving server 106 is in a state of not being able to transmitting the request due to the performance decline 405.

After step 413, when the message receiving server 106 receives the message from the communication terminal 101 (step 431), the message receiving server 106 selects a distribution destination with respect to the data store server status information 250 to which the processing result of step 433 is reflected (step 432). In step 432, the distributed processing unit 210 of the message receiving server 106 selects the virtual queue to be stored from the message destination and the virtual queue information 233, and selects the data store server 107a including the distribution queue corresponding to the virtual queue in the distribution queue list 254 according to distribution method information 234.

Next, the message receiving server 106 performs the performance decline determination processing 433. Step 433 is an example in which the distributed processing unit 210 of the message receiving server 106 determines "performance decline" in the performance decline determination processing for each periodic time.

The performance decline determination processing in FIG. 4 is checked and performed at a timing (step 403, step 413, step 452, and step 456) immediately before the distributed processing unit 210 transmits the request to the data store server 107, a timing (step 435, step 441, and step 453) at which the distributed processing unit 210 receives the response from the data store server 107, and each periodic time of millisecond order, but is omitted because it is not determined as "performance decline".

The distributed processing unit 210 performs the performance determination processing even before the message storing request 413 immediately after the performance decline 405, but a parameter included in the performance decline determination condition 231 is compared as an average value (or not exceeding the minimum number of times of determination) and is not determined as "performance decline".

In step 433, the distributed processing unit 210 of the message receiving server 106 performs the following processing. First, the distributed processing unit 210 of the message receiving server 106 performs the performance decline determination by comparing the current value 255 of the determination target of the data store server status information 250 of the data store server 107a with the performance decline determination condition 231 (step 433).

Specifically, the distributed processing unit 210 of the message receiving server 106 determines whether each parameter stored in the current value 255 of the determination target exceeds a threshold value of a corresponding parameter within the performance decline determination condition 231.

The performance decline determination condition 231 used in step 433 is a setting of a storing request type. Hereinafter, in step 433, although not explicitly described, the performance decline determination condition 240A of the storing request is used. First, the distributed processing unit 210 compares the processing elapsed time 241 with the current value between the processing elapsed times included in the current value 255 of the determination target (average value between the processing elapsed times of the message storing requests 403 and 413).

Next, the distributed processing unit 210 compares the connection number 242 with the current value (2 connections of the message storing requests 403 and 413) of the connection number included in the current value 255 of the determination target. Next, the distributed processing unit 210 compares the simultaneous processing number 243 with the current value (2 connections of the message storing requests 403 and 413) of the simultaneous processing number (the number of processes of the distributed processing unit 210) included in the current value 255 of the determination target. Next, the distributed processing unit 210 compares the transmission waiting number 244 with the current value of the message transmission waiting number to the data store server 107 included in the current value 255 of the determination target.

Regarding the response time 245, the distributed processing unit 210 checks and performs the performance decline determination at the timing at which the response is received from the data store server 107 or each periodic time.

In a case where any one of the parameters of the performance decline determination condition 231 exceeds the threshold value, the distributed processing unit 210 describes the "performance decline state" in the working information 253 (which is registered in the master of the working server 252) of the data store server 107 corresponding to the data store server status information 250, which is determined as the performance decline, and describes the "performance decline state by the cooperation destination" in the working information 253 of the data store server status information 250 corresponding to the data store server 107b cooperating with the data store server 107a exhibiting the decline in the performance, which is included in the working server 252 or the data store server configuration information 222.

The detection of the performance decline intended by the present invention when the performance decline state is 1 second or less may determine the "performance decline state" by the combination of the parameters in a case where the detection is difficult by only one parameter of the determination condition 231. After that, since the data store server 107a selected in step 432 is in the "performance decline state" and the data store server 107b is in the "performance decline state by the cooperation destination", the distributed processing unit 210 changes the transmission destination to a data store server 107c.

The working information 253 of the data store server status information 250 is checked for each periodic time at the time of response reception of the data store server 107, and the "performance decline state" and the "performance decline state by the cooperation destination" are released when is less than the threshold value of the performance decline determination condition 231 in the performance decline determination when the distributed processing unit 210 transmits the request to the data store server 107.

The parameter at the time of the performance decline state of the resource limit value information 232 is applied to the data store server 107 that is in the "performance decline state" or the "performance decline state by the cooperation destination". In FIG. 4, the message receiving server 106 consumes the resources such as the connection number 242 and the simultaneous processing number 243 with respect to the data store server 107a.

In a normal state, the performance of the data store server 107 is maximized and the resources such as the connection number 242 and the simultaneous processing number 243 are set to sufficient values. However, in a case where a certain data store server 107 exhibits a decline in the performance, conversely, it is likely that most of the resources of the distributed processing unit 210 will be consumed in the data store server 107 that is under the performance decline. Therefore, by applying the parameter of the performance decline state that is a lower value than a value of the normal state of the resource limit value information 232, the distributed processing unit 210 realizes the resource protection at the time of the performance decline state.

Next, the message receiving server 106 transmits the message storing request to the data store server 107c (step 434), and the data store server 107c stores the message data 342 and the message related information 343 in the distribution queue data 340 matched with the distribution queue of the storage destination included in the received message storing request, and transmits the successfully stored response (step 435) (the data store server 107c also performs the processing cooperation with another data store server 107, but is omitted in FIG. 4). Next, the message receiving server 106 transmits a normal response 436 corresponding to the message 431 to the communication terminal 101, and normally ends the message reception sequence.

Steps 441 and 442 are the behavior of the message receiving server 106 in a case where the data store server 107a exhibiting the decline in the performance in step 405 is restored in a short time. The message receiving server 106 continues the processing when receiving the response 441 in which the message storing request 403 is successfully stored before the response timeout, transmits the normal response 442 for the message 401 to the communication terminal 101, and normally ends the message reception sequence. In order to manage the performance decline determination condition 231, such as the processing elapsed time 241 or the like, as the parameter separate from the response time 245, the distributed processing unit 210 of the message receiving server 106 can set the values of the response timeout and the cooperative processing timeout between the data store servers 107, which are values shorter than the response timeout, to be equal to or greater than the network device.

On the other hand, as in the prior art, when the distributed processing unit 210 performs the determination at the response time 245, the performance decline cannot be detected from step 403 to step 441. Even when the distributed processing unit 210 performs the determination at the response timeout, the detection is impossible from step 403 until after the elapse of the response timeout (even after step 441). When the distributed processing unit 210 performs the determination at the response timeout and the response timeout is shorter than a gap from step 403 to step 441, step 441 that is originally a normal response is regarded as an error, and therefore, there is a problem that an error frequently occurs.

Due to the processing elapsed time 241, the connection number 242, the simultaneous processing number 243, and the transmission waiting number 244 of the performance decline determination condition 231, the distributed processing unit 210 can monitor whether the response is not delayed with respect to the message that is currently processed by the distributed processing unit 210 (whether the performance of the data store server 107 does not decline) and can prevent the occurrence of a large amount of error and avoid the service stop of the data store server 107 by reducing the probability of occurrence of the response timeout.

Steps 451 to 456 are the transmission sequence of the message system. The distributed processing unit 210 of the message sending server 108 selects the data store server 107 that periodically acquires the message (step 451). The acquisition source selection 451 is processing similar to the distribution destination selection 403. The distributed processing unit 210 selects the data store server 107c not including the "performance decline state" among the data store server status information 250 which the message sending server 108 can acquire, according to the acquisition method information 235. In step 451, the distributed processing unit 210 of the message sending server 108 may start the processing by receiving the event of the acquisition from other servers.

Next, the distributed processing unit 210 of the message sending server 108 transmits the message acquisition request to the data store server 107c (step 452) and receives a plurality of messages from the data store server 107 (step 453). In step 453, the message sending server 108 can acquire the message data 342 and the message related information 343, which are stored in the plurality of distribution queue data 340 of the data store server 107, in a lump.

Steps 451 to 453 are performed by the distributed processing units 210 of the plurality of message sending servers 108 inside the message system (details will be described with reference to FIG. 5). The distributed processing unit of the message sending server 108 acquires the message by accessing the plurality of data store servers 107 connected in a mesh shape in the message system. One data store server 107 receives the message acquisition requests 452 from the distributed processing units 210 of the plurality of message sending servers 108 and sequentially processes the message acquisition requests 452.

Next, the message sending server 108 converts the message received in step 453, so that the message can be transmitted to the message transfer server 105, and then transmits the message (step 454). The message receiving server 106 receives a normal response from the message transfer server 105 (step 454), confirms the message transmission success, transmits the message deletion request 456 to the data store server 107, and ends the message transmission sequence.

Figure 5:
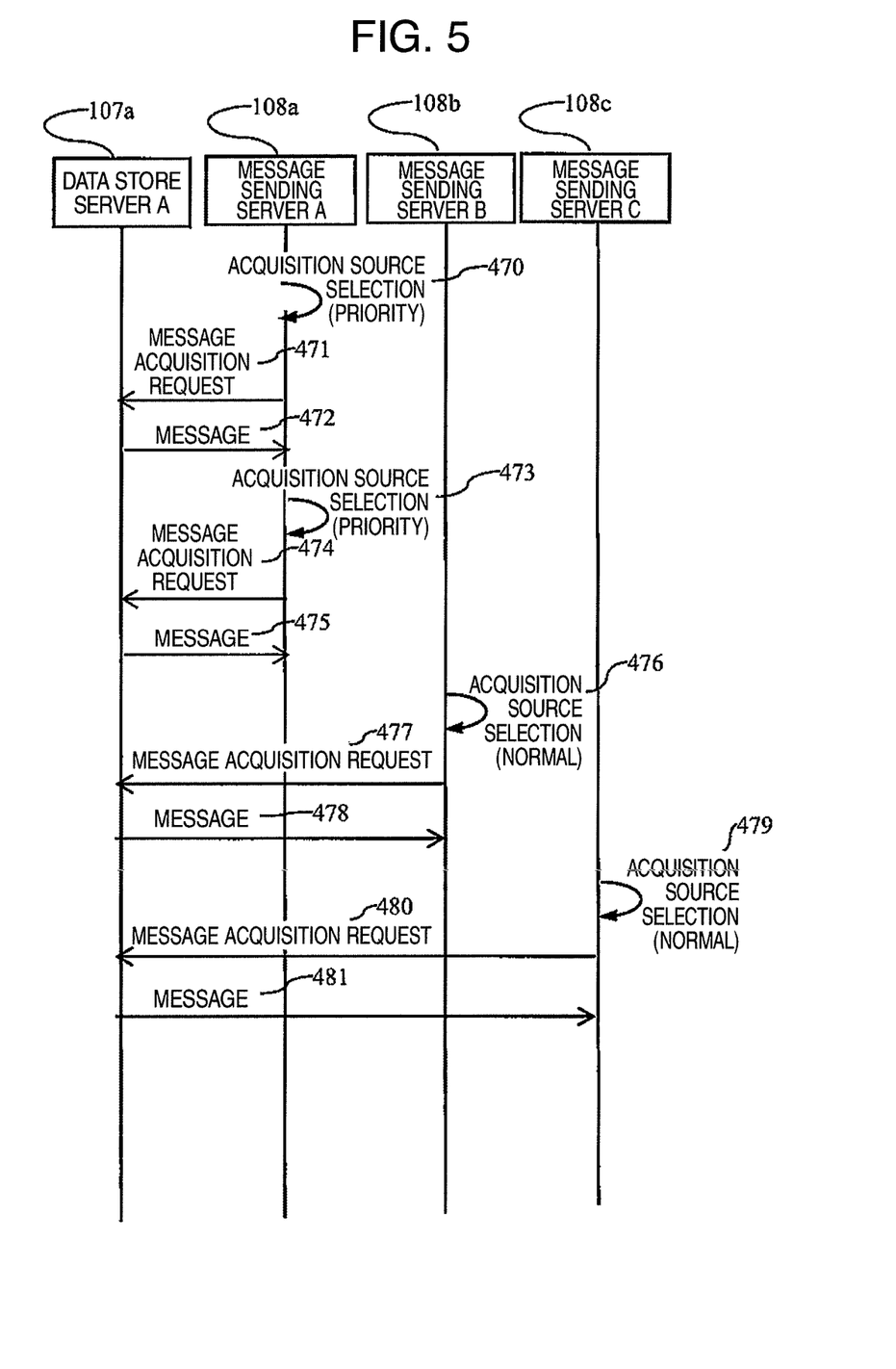
FIG. 5 illustrates an example of a message acquisition sequence of the message system.

FIG. 5 is a diagram illustrating an example of the message acquisition sequence of the message system. FIG. 5 is a part of the message relay sequence of the message system illustrated in FIG. 4 and illustrates a sequence in which the distributed processing units 210 of the plurality of message sending servers 108 acquires the messages from the queue of the data store server 107 according to the contents stored in the acquisition method information 235.

The data store server 107 designated by the acquisition method information 235 is statically or dynamically set according to the situation of the server or the network. For example, in order to reduce a network load between the data store server 107 and the message sending server 108, it may be set such that the acquisition from the data store server 107 on the same apparatus or the data store server 107 having a close distance on the network (for example, the number of hops) is preferred.

The correspondence relationship of the plurality of queues or the plurality of data store servers 107 and the plurality of message sending servers 108 at the time of message acquisition can be freely set. For example, the correspondence relationship is set according to conditions such as the network load, the distance of the server on the network (for example, the number of hops), the server load, or the like. In addition, the correspondence relationship can also be dynamically changed according to the situation at the time of failure.

First, the distributed processing unit 210 of the message sending server 108*a* selects the data store server 107*a*, which is set to be preferentially acquired, among the plurality of corresponding data store servers 107 described above (step 470), transmits the message acquisition request (step 471), and acquires the message (step 472).

Here, the expression "set to be preferentially acquired" means a state in which the priority is set to be higher than other message sending servers with respect to one or more items related to the acquisition, for example, the acquisition order is earlier, the number of times of acquisition is large, the interval of acquisition (interval of steps 471 and 474) is short, and the number of messages acquirable at once is large. As described above, these items are set to the acquisition method information 235.

In addition, the priority related information corresponding to the acquisition method information 235 is held by each data store server 107. By changing the response contents (for example, the number of response messages) with respect to the acquisition from each message sending server 108, as a result, the priority may be controlled.

FIG. 5 assumes a system configuration in which the data store server 107*a* is disposed on the same apparatus as the message sending server 108*a* and is provided on a different apparatus from other message sending servers 108*b* and 108*c*. In this case, in order to reduce the load on the network between the apparatuses, it is preferable that the interval of the message acquisition requests 474 is set to be shorter than other message sending servers 108 provided on other apparatuses and the priority is increased, so that the distributed processing unit 210 of the message sending server 108*a* preferentially acquires the message from the data store server 107*a* provided on the same apparatuses. In this case, the distributed processing units 210 of the message sending server 108*b* and the message sending server 108*c*, which are not the preferential acquisition target and have a normal priority, acquire the message from the data store server 107*a* at normal acquisition intervals.

According to the above-described configuration, it is possible to establish the system in which, even when the message sending server 108*a* is stopped due to the failure or the like, the message acquisition, that is, the service, is not stopped because the distributed processing units 210 of the message sending server 108*b* and the message sending server 108*c* acquire the message of the data store server 107*a*.

In addition, if the distributed processing unit 210 of the message sending server 108 has the ability to acquire more message than the number of message generally remaining in the queue, the number of acquired messages is increased without being newly set, even when the message sending server 108*a* is stopped and a large amount of messages remain in the queue of the data store server 107*a*, thereby reducing the influence on the service performance (throughput).

Alternatively, the messages, the number of which is smaller than the number of messages that can be acquired at once can be set as a normal acquisition number with respect to the distributed processing unit 210 of the message sending server 108. If necessary, the number of messages that are acquired at once by the message sending server 108*b* or 108*c* may be increased to the upper limit. In this manner, similar to the above example, it is possible to reduce the influence on the service performance (throughput) even when the message sending server 108*a* is stopped and a large amount of messages remain in the queue of the data store server 107*a*.

The above-described configuration makes it possible to realize a system that can stably provide a service even when a failure occurs, without implementing processing dedicated to failure handling.

Next, a second embodiment is described. The second embodiment is a method that operates data store servers 107 separately in two groups of different networks and make the message system be highly available than the first embodiment. A difference between the second embodiment and the first embodiment will be described below with reference to FIG. 6.

Figure 6:
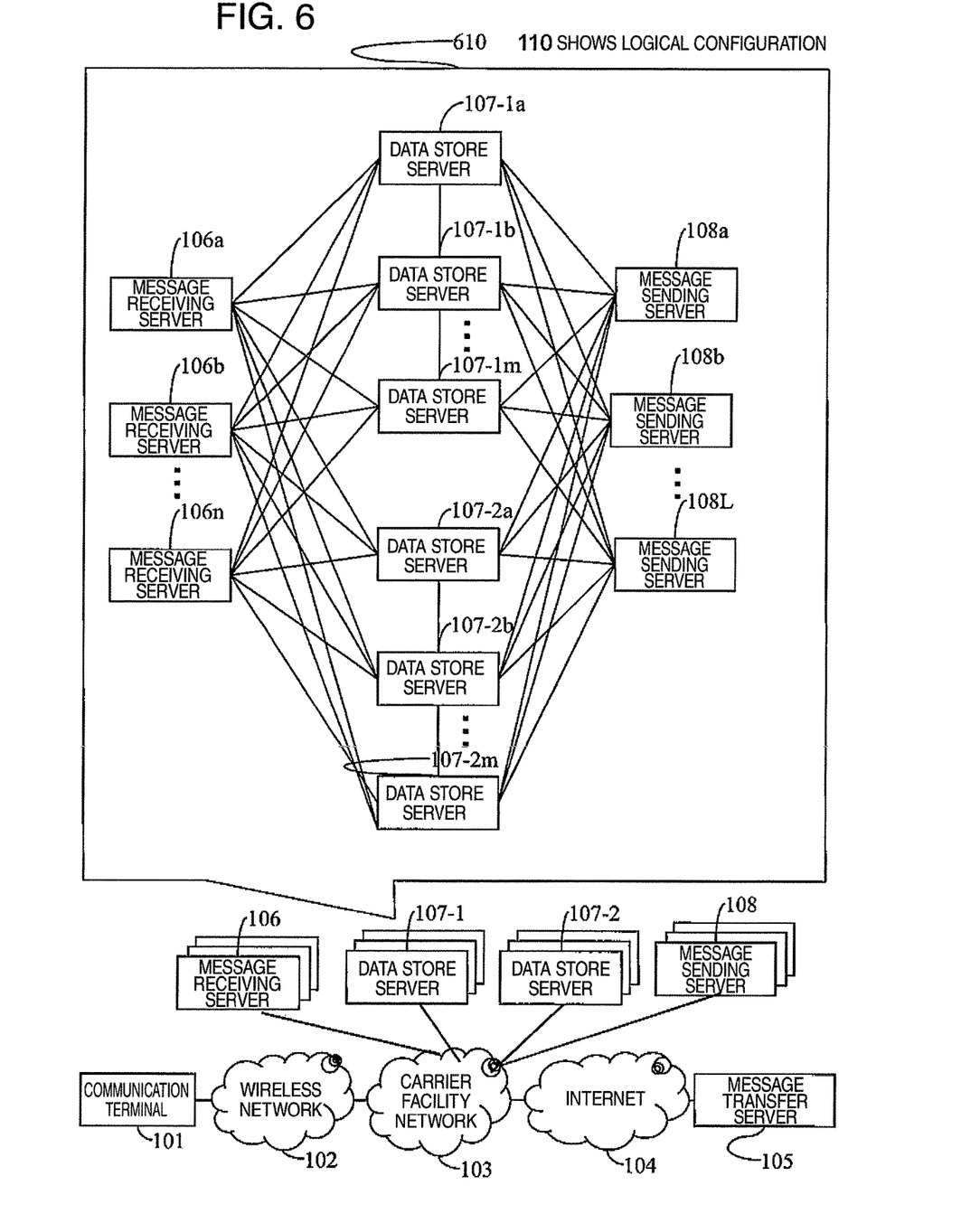
FIG. 6 is a block diagram illustrating a schematic configuration of a system according to a second embodiment.

The second embodiment takes a system configuration illustrated in FIG. 6, instead of FIG. 1. The data store server 107 is configured by a 107-1 group and a 107-2 group, and the groups are respectively connected to different networks (different network devices). The message receiving server 106 and the message sending server 108 recognize each of the 107-1 and 107-2 groups of the data store server and access the data store server 107 by switching the network.

When the network is divided by the failure of some network devices in order for cooperative processing of the data store server 107 with other data store servers 107 through the network, all the data store servers 107 of the network (group) may stop services.

Therefore, in the second embodiment, a plurality of groups of the data store server 107 is created in different networks, thereby reducing the probability of all stop of services, and the message receiving server 106 and the message sending server 108 access the data store server 107 of any working group, thereby avoiding the service stop.

In the configuration of the second embodiment, each data store server 107 sets the master or the slave within the belonging group to the held queue, and furthermore, sets the order of being the master when there exists plural slaves, to the held queue, as indicated in the carrying key range information 251. In a case where a failure occurs in a certain data store server 107, one of the data store server 107 having another queue set by the slave becomes the master (is promoted to the master) of the corresponding queue according to the order within the group and copes with the continuing processing instead of the failed data store server 107.

Furthermore, in the configuration of the second embodiment, the data store servers 107 of the different groups are combined and arranged on the same server apparatus, and when the groups are different, the order of promoting to the master may be differently set.

For example, the data store servers 107 of the different groups are arranged on the same apparatus one by one. Specifically, the data store server 107-*1a* and the data store server 107-*2a* are arranged on the same apparatus, and similarly, the data store server 107-*1b* and the data store server 107-*2b* are arranged in another same apparatus. Furthermore, the order of promoting to the master of the queue set as the slave in one group of the data store server 107 and another group is differently set (for example, in a reverse direction).

By such setting, even when the failure occurs in the apparatus in which the data store server 107-*1a* and the data store server 107-*2a* are arranged, the queue of the data store server 107 on the different apparatuses becomes a next master, thereby continuing the processing while suppressing the increase of the load.

In the second embodiment, in FIG. 2, the information having recognized the group of the data store server 107 is added to the distribution method information 234. In the first embodiment, the distribution method information 234 stores the distribution method of the data store servers 107 of the same group, such as the distribution method by the hash calculation of the key and the distribution method such as the round robin, the least connection, or the like. In the second embodiment, the distribution method between the groups of the data store servers 107 is also stored.

For example, by the hash calculation of the key, there is a method of determining whether to store in the group of the data store server 107 being the distribution destination (storage destination) and the data store server 107 of the group in a distributed manner, or a method by which the groups being the distribution destination (storage destination) for each time in the round robin or the least connection is differently stored.

The working server 252 of the data store server status information 250 stores the IP addresses of the data store servers 107 of the groups of the data store servers 107-1 and 107-2. The distributed processing unit 210 manages the data store server status information 250 in units in which the carrying key range information 251 and the working server 252 are combined as one set, and then selects the data store servers 107 (working server 252) of the different networks at the time of performance determination, thereby avoiding the service stop of the data store servers 107. In addition, the distributed processing unit 210 can detect a temporary stop in group units of the data store servers 107 from the data store server configuration information 222 or the data store server consultation information 223 and can switch to other group.

REFERENCE SIGNS LIST

101 Communication terminal'
103 Carrier facility network
105 Message transfer server
106 Message receiving server
107 Data store server
108 Message sending server

The invention claimed is:

1. A message system comprising:
a communication terminal;
a plurality of message receiving servers that are communicatively coupled to the communication terminal via a network, wherein at least one of the plurality of message receiving servers receive a message from the communication terminal;
a plurality of data store servers that are communicatively coupled to the plurality of message receiving servers, wherein at least one of the plurality of data store servers store the message and information related to the message; and
a plurality of message sending servers that are communicatively coupled to plurality of data store servers, wherein at least one of the plurality of message sending servers deliver the message to a receiving destination; and
wherein a processor of the at least one of the plurality of message servers:
detects a first decline in performance of the plurality of data store servers before a response timeout with the plurality of data store servers occurs,
determines the at least one of the plurality of data store servers based on the first decline in the performance detected,
generates control information related to storage of the message in the at least one of the plurality of data store servers, and
transmits to the at least one of the plurality of data store servers the message, the information related to the message and the control information; and
wherein a processor of the at least one of the plurality of data store servers:
receives, from the at least one of the message receiving servers the message, the information related to the message and the control information,
transmits a cooperative request to additional data store servers from the plurality of data store servers according to the control information, and
performs cooperative processing with the additional data store servers to store the message and the information related to the message;
wherein a processor of the at least one of the plurality of message sending servers:
detects a second decline in performance of the plurality of data store servers,
retrieves, from the at least one of the plurality of data store servers, the message and the information related to the message based on the second decline in performance detected, and
transmits to the message to the receiving destination.

2. The message system according to claim 1,
wherein the first decline is detected by acquiring one or both of correlation information of cooperative processing between the at least one of the plurality of data store servers and consultation information based on information exchanged with the additional data store servers.

3. The message system according to claim 2,
wherein the plurality of data store serves include groups of mutually independent data store servers; and
wherein the at least one of the data store servers belongs to a group separate from a group of data store servers that had the first decline detected.

4. The message system according to claim 3,
wherein the processor of the at least one of the plurality of message receiving servers further:
determines a group of the plurality of data store servers that is in a service stop, based on one or both of the correlation information and the consultation information, and switching to a group that is not in the service stop.

5. The message system according to claim 3,
wherein an order of setting a queue held within the group as a master is set differently from other groups.

6. The message system according to claim 2,
wherein the control information includes a resource limit that is changed when the first decline is detected.

7. The message system according to claim 2,
wherein the processor of the at least one of the plurality of message receiving servers further:
manages queues associated with each of the plurality of data store servers as one queue in an entire system,
stores the message in one of the queues by searching and selecting a particular queue of the at least one of the plurality data store servers.

8. The message system according to claim 1,
wherein the first decline in performance or the second decline in performance is detected by determining an elapsed time from a transmission of a request to the plurality of data store servers, and comparing the elapsed time to a threshold value.

9. The message system according to claim 1, wherein the first decline in performance or the second decline in performance is detected by determining a number of simultaneously executed processes or a number of connections of the plurality of data store servers and comparing the number of simultaneously executed processes and the number of connections to respective thresholds.

10. The message system according to claim 1, wherein the first decline in performance or the second decline in performance is detected by determining a number of messages waiting for a transmission.

* * * * *